United States Patent [19]

Norris et al.

[11] 4,422,675
[45] Dec. 27, 1983

[54] CO-AXIAL TUBE COUPLING

[75] Inventors: James R. Norris, Bolton; Norman W. Narkon, Manchester, both of Conn.

[73] Assignee: United Technologies Corporation, Hartford, Conn.

[21] Appl. No.: 287,680

[22] Filed: Jul. 29, 1981

[51] Int. Cl.³ .............................................. F16L 11/12
[52] U.S. Cl. ........................................ 285/45; 285/14;
285/81; 285/93; 285/133 R; 285/175; 285/332;
285/353
[58] Field of Search ............ 285/4, 13, 14, 15, 133 R,
285/45, 337, 175, 93, 332, 353, 81

[56] References Cited

U.S. PATENT DOCUMENTS

| 2,009,744 | 7/1935 | Pfefferle | 285/337 X |
| 2,954,742 | 10/1960 | Williams | 285/13 X |
| 3,913,949 | 10/1975 | Senatro | 285/175 X |
| 4,087,119 | 5/1978 | Capdebosc | 285/45 X |
| 4,295,666 | 10/1981 | Melanson | 285/175 X |

Primary Examiner—Dave W. Arola
Attorney, Agent, or Firm—Norman Friedland

[57] ABSTRACT

A dual or single wall coupling for a fuel line for capturing fluid in the event that leakage occurs at the main coupling and/or the primary tube comprising a lightweight slidable sleeve element shrouding the primary coupling engaging on its inner diameter axially spaced radial seals. The sleeve assembly permits the utilization of commercially available standard couplings and eliminates the tedious assembly techniques required that were necessary heretofore.

7 Claims, 8 Drawing Figures

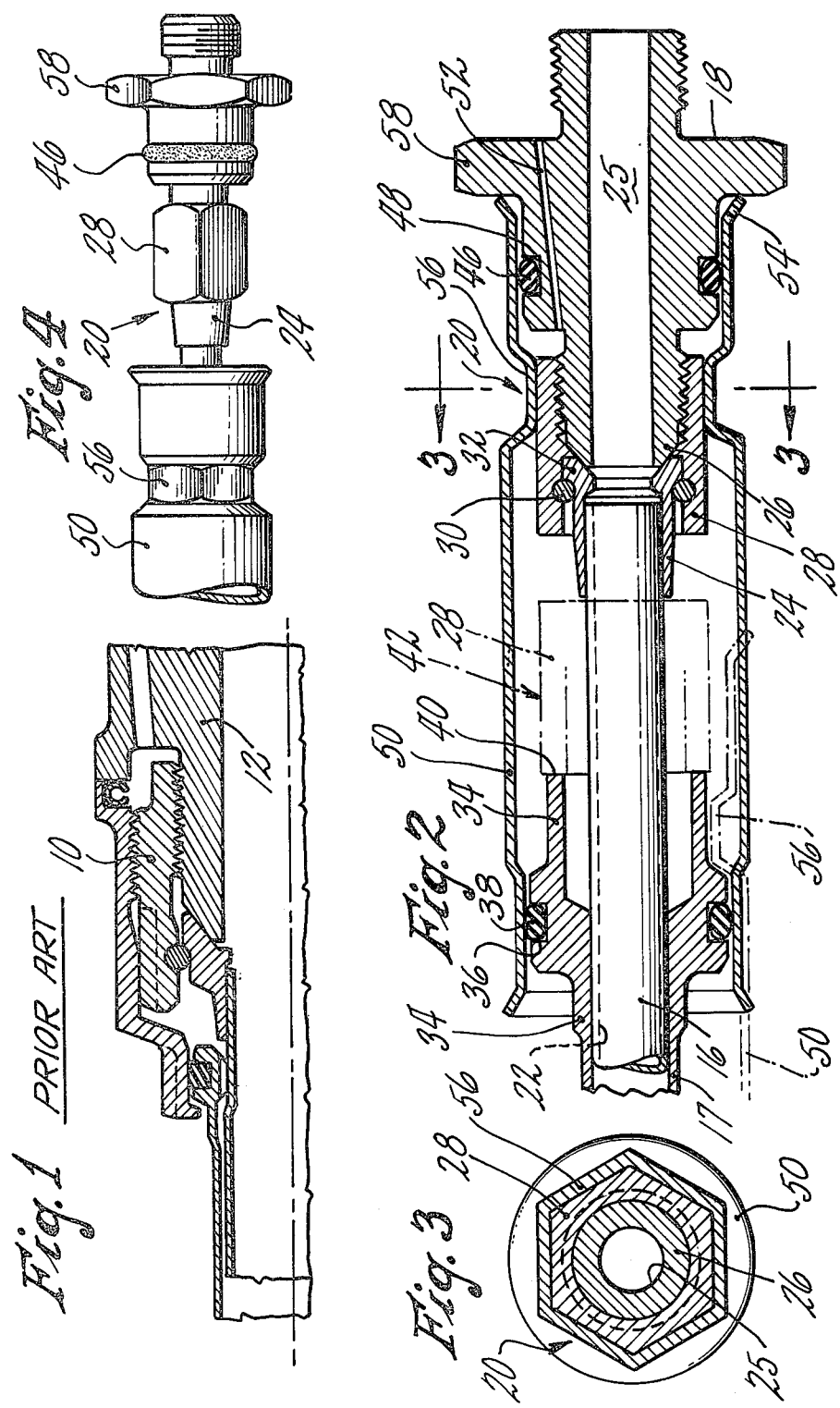

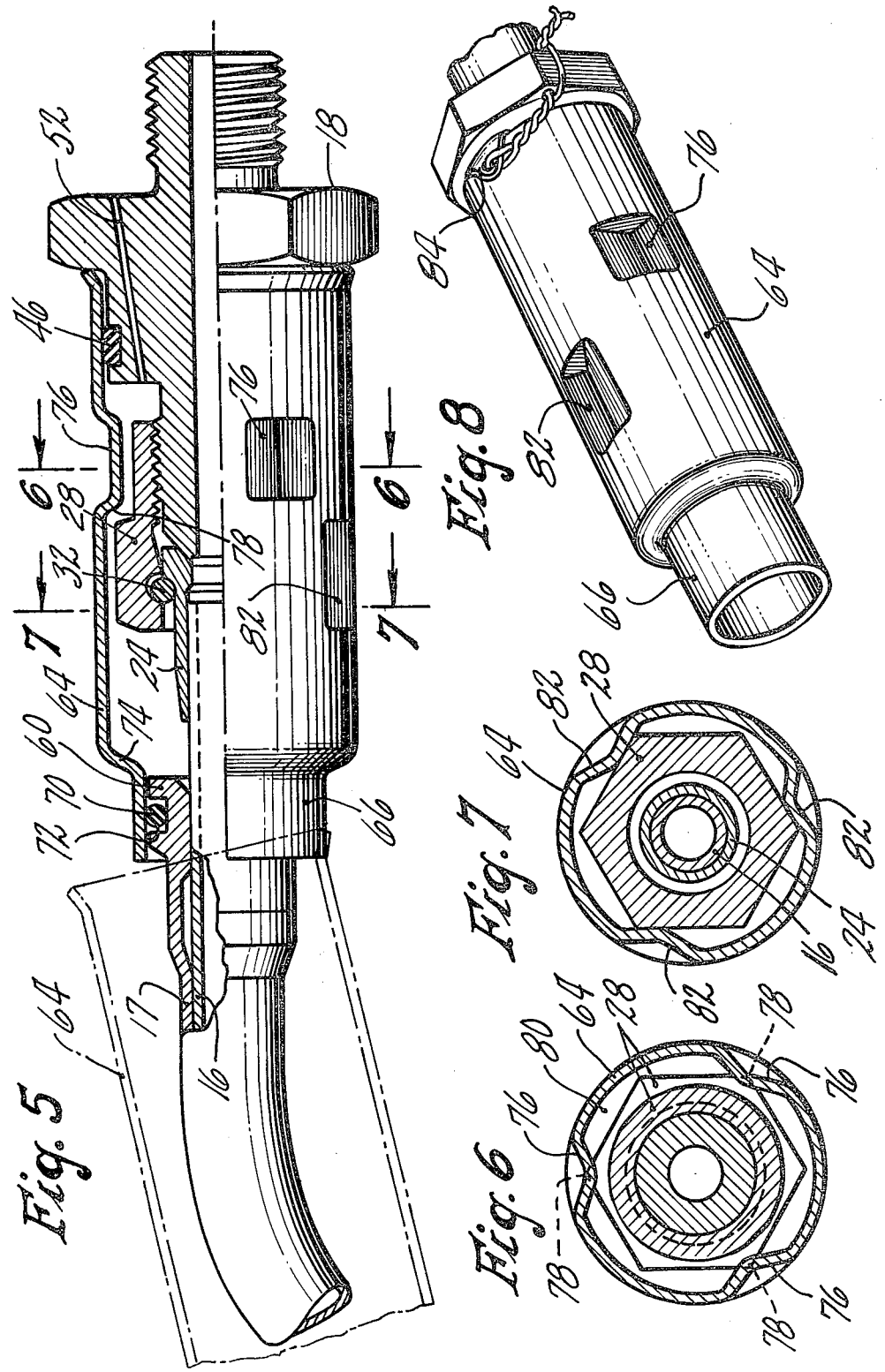

CO-AXIAL TUBE COUPLING

DESCRIPTION

1. Technical Field

This invention relates to couplings and particularly to the dual couplings utilized for flammable fluids in aircraft applications.

2. Background Art

This invention constitutes an improvement over the coupling disclosed in U.S. Pat. No. 3,913,949 granted to C. A. Senatro on Oct. 21, 1975 and assigned to the same assignee as this patent application. The coupling in the U.S. Pat. No. 3,913,949 supra, exemplifies the prior art coupling and is shown in FIG. 1 as representing the prior art. As noted, in FIG. 1 this coupling carries an inner nut 10 that is internally and externally threaded. The inner threads are threaded to the fixed fitting 12 by torquing with a suitable tool. The outer nut 14 engages the external threads and this likewise requires torquing by a suitable tool. Because of the high torquing requirements, the tool engagement surface is large and the strength of the material used is necessarily high. Obviously, owing to the large diameter and the high strength material, this coupling not only tended to be heavy, it also tended to be large. Other disadvantages of this coupling is the fact that cumbersome torquing by the operator to assemble and disassemble the connector was necessary. The joints had to be specially manufactured, in contrast to using substantially standard fittings.

We have found that we can obviate the disadvantages enumerated above by providing a lightweight slidable sleeve that engages axially spaced radial seals spanning the juncture where the tubes are connected which sleeve serves to capture any fluid inadvertently escaping the primary flow lines. The sleeve assembly permits the use of standard fittings, is simple, lightweight and low in cost. It eliminates the need for special tooling as heretofore required. There is no outer nut and hence this torquing requirement is eliminated. In one preferred embodiment, the sleeve may be swaged to include a detent that aligns with the nut of the primary fitting to prevent inadvertent unthreading. In a stepped version of the sleeve where the fitting is in different diameters, special safeguards are provided to prevent blowoff resulting from captured pressurized fluid.

DISCLOSURE OF INVENTION

An object of this invention is to provide for a primary flammable fluid conductor a sleeve-like element shrouding the fitting of the conductor to collect or contain any inadvertent leakage. A feature of the invention in that the sleeve is slidable and engages radial seals axially spaced to span the conductor's fitting and is characterized by being simple, lightweight, low cost and eliminates much of the torquing that was heretofore required.

A feature of a preferred embodiment is simplified means on the sleeve for preventing rotation of the nut of the primary conductor's fitting.

A feature of another preferred embodiment is detent means on the sleeve for preventing blowoff occasioned by pressurized escapement fluid acting on the stepped sleeve embodiment.

Other features and advantages will be apparent from the specification and claims and from the accompanying drawings which illustrate an embodiment of the invention.

BRIEF DESCRIPTION OF DRAWINGS

FIG. 1 is a partial view in schematic illustrating the prior art;

FIG. 2 is a view in section illustrating a preferred embodiment of the invention;

FIG. 3 is a view in section taken along lines 3—3 of FIG. 2;

FIG. 4 is a view in elevation showing a partial sleeve in the retracted position;

FIG. 5 is a view partly in schematic, partly in elevation and partly in section illustrating another embodiment of the invention;

FIG. 6 is a view in section taken along lines 6—6 of FIG. 5;

FIG. 7 is a view in section taken along lines 7—7 of FIG. 5; and

FIG. 8 is a perspective view illustrating the novel sleeve of FIG. 5.

BEST MODE FOR CARRYING OUT THE INVENTION

While the invention in its preferred embodiment is utilized on a jet engine for aircraft application, it is to be understood, as is apparent to anyone skilled in the art, that this invention has utility in other applications where leakage may occur and its containment is desired. Also, it should be understood that while this invention is particularly efficacious for dual wall tubing constructions, it could be similarly utilized for single wall, where protection against leakage at the fittings is contemplated. As shown in FIGS. 2, 3 and 4, the tube 16 concentrically mounted within tube 17 is coupled to the connector 18 by commercially available coupling generally illustrated by reference numeral 20 to be described hereinbelow and when joined communicates passageway 22 with passageway 25 for defining the primary passageway to receive or deliver fuel. Coupling 20 comprises a standard commercially available ferrule 24 that is suitably bonded, say by brazing to the end of tube 16 and the forward end mates against the male fitting 26 of connector 18. The commercially available primary nut 28 carries the typical ring wire 30 forming a unitary unit that is threadably connected to the male fitting 26. The ring wire 30 engages the shoulder 32 formed on the end of ferrule 24 to seat the ferrule to the male fitting to assure a leak-tight fit.

As contemplated by the invention an adapter 34 is fitted and bonded to pipe 17 and carries a circumferential groove on its outer surface to receive "O" seal 38. The forward edge 40 of adapter 34 is sufficiently spaced from nut 28 to permit the nut to be retracted a sufficient distance to assemble and disassemble the fitting as shown by phantom lines 42.

The fitting 18 is adapted to receive a second radial seal, "O" seal 46 fitted into circular groove 48. As will be appreciated from viewing FIG. 2, the outer dimensions of assembly 36 and 38 and 46 and 48 respectively are substantially identical and are axially spaced to span the joint made by fitting 20.

Hence, in accordance with this invention, hollow sleeve 50 (circular in cross section) slides over the "O" seals 38 and 48 and form a confinement cavity to capture and confine any fluid resulting from an inadvertent leakage in the primary flow passage between the two "O" seals. A leak indicator passage 52 may be included to leak a small amount of captured fluid to indicate that a leak has occurred.

The sleeve 50 may be swaged as shown in FIG. 3 to form a hexagonal detent 56 to compliment the shape of the primary nut 28 so that when these parts meet, they become contiguous and the sleeve thereof locks the primary nut 28 into place avoiding inadvertent disassembly. A lock wire hole may be included so that the sleeve can be secured and prevented from rotating by suitably grounding it by suitable lock wire (not shown).

As can be seen in FIG. 4, the sleeve 50 is installed on the fitting before the ferrule 32 is connected and is retracted as shown in phantom 42 of FIG. 2. The fitting is then coupled as shown, by torquing primary nut 28.

The retracted sleeve 50 is then deployed to the right and positioned over "O" ring 46 until the righthand end meets the enlarged diameter nut portion 56 of fitting 18. At this point the sleeve is in its operating position.

Because the sleeve is virtually of a constant diameter and all bends are designed to be pressure compensating, in the event of capturing pressurized fluid, there is no axial load on the sleeve. Hence, there is no possibility of "blow off", i.e. the pressure acting on the sleeve is solely in a radial direction and not in an axial one.

There are occasions where it is desirable or necessary to design the sleeve so that there is a reduced diameter portion. This is done to accomplish the proper axially spaced radial sealing. Such an embodiment is disclosed in FIG. 5. As noted in FIG. 5 the primary connection and fittings are identical as in FIG. 2 and like reference numerals are for like or equivalent parts. However, the adapter 60 which is similar to adapter 34 of FIG. 2 has a smaller diameter than the diameter of adapter portion of the fitting 18. Hence, to accommodate this diameter reduction, the sliding sleeve 64 shown in FIGS. 5 and 8 carries a reduced diameter portion 66 designed to engage "O" ring 70 disposed in circular groove 72 formed in adapter 60. This forms a shoulder 74 on the internal diameter of sleeve 64 and pressurized captured leakage fluid within the sleeve cavity can create an axial force which force urges the sleeve to "blow off".

To prevent this from occurring detents 76 are discretely formed in sleeve 64 so that in installed position the rearward edge 78 of detent 76 lies behind the high point of the primary nut 28 preventing the "blowoff" from occurring. The detent 76 is sized such that the inner diameter is greater than the outer diameter of the flats 80 of the hexagonal shaped nut 28. Hence, to assemble, the sleeve 64 slides over the nut orienting the detents to overlie the flats 80 and once in place the sleeve 64 is rotated slightly to orient the low points of the detent to mate the high points of nut 28. Locator detents 82 are formed on the rearward portion of sleeve 64 and mate with the hex of the nut and serve to prevent untorquing of nut 28 when the sleeve 64 is prevented from rotating by lock wire or other means. As noted, each detent is formed in a triangular shape so that the apex forms the smallest diameter portion of the sleeve and it is axially extended in the same direction as the hexagons are formed on the primary nut. This is done to facilitate the sliding of the sleeve for assembling and disassembling the coupling. Tabs 84 (one being shown) may be carried by the end of sleeve 64 to accommodate lock wire if desired.

It should be understood that the invention is not limited to the particular embodiments shown and described herein, but that various changes and modifications may be made without departing from the spirit and scope of this novel concept as defined by the following claims.

We claim:

1. A coupling for connecting tubing to a connector including a connector and a tubing, each having a passageway therethrough, said connector having a generally circular elongated body having said passageway in axial alignment with said passageway in said tubing, said connector having a threaded end, a retractable nut adapted to threadably engage said threaded end, a ferrule member and means sealingly securing said ferrule member to the end of the tubing intended to be joined by said coupling, means on said nut cooperating with said ferrule to secure said ferrule in sealing engagement with said connector, an adapter having a circular cross section axially spaced from said ferrule and means sealingly securing said adapter to said tubing and a first radial seal supported in a recess formed in the outer diameter of said adapter, a second radial seal axially disposed relative to said first radial seal and supported in a recess formed in the outer diameter of said circular elongated body of said connector, the diameter of said first radial seal being substantially equal to the diameter of said second radial seal, a retractable sleeve-like element having a generally hollow cylindrical body being dimensioned to engage each of said radial seals spanning said ferrule when deployed in its operating condition for capturing and containing any leakage from said passageways.

2. A coupling as in claim 1 wherein said nut has an outer tool engaging surface, detent means formed on said sleeve-like element complimenting and engaging said tool engaging surface for preventing said nut from disengaging, and means for preventing said sleeve from rotating.

3. A coupling as in claim 2 wherein said ferrule includes a conically-shaped seal engagement surface formed on one end, a complimentary seal engagement surface formed on the end of said connector adapted to engage said ferrule seal engagement surface whereby threading of said retractable nut forces said seal engagement surfaces into sealing relationship.

4. A coupling as in claim 3 wherein said radial seals are "O" rings.

5. A coupling for connecting a pair of concentric tubings to a connector including a connector and a pair of concentric tubings, all having a passageway therethrough, said connector having a generally circular elongated body having said passageway in axial alignment with said passageway in the tubing, said connector having a threaded end, a retractable nut adapted to threadably engage said threaded end, a ferrule member and means sealingly securing said ferrule member to the end of the inner of said pair of concentric tubings intended to be joined by said coupling, means on said nut cooperating with said ferrule to secure said ferrule in sealing engagement with said connector, an adapter having a circular cross section sealingly mounted on the end of the outer of said pair of concentric tubing axially spaced from said ferrule and surrounding said inner tubing and a first radial seal supported in a recess formed in the outer diameter of said adapter, a second radial seal axially disposed relative to said first radial seal and supported in a recess formed in the outer diameter of said circular elongated body of said connector, the diameter of said first radial seal being unequal to the diameter of said second radial seal, a retractable sleeve-like element having a generally hollow cylindrical body being dimensioned to engage each of said radial seals when deployed in its operating condition for capturing and containing any leakage from said passageways, said hollow cylindrical body having a smaller diameter portion on one end defining a radial wall where captured pressurized fluid can react against said wall to force said cylindrical body to move axially and out of seal engagement, detent means formed in said hollow cylindrical body extending radially inward adapted to slide over and beyond the top surface of said nut and having inner dimensions to engage the larger diameter portion of said nut when rotated and moved back in the direction of said top surface.

6. A coupling as in claim 5 wherein said detent means are triangularly shaped and the apex extends radially inward and is elongated axially and parallel to the axial center line of said nut, whereby sliding said sleeve-like element into sealing engagement the detent means orient said sleeve-like element to facilitate sliding over said nut.

7. A coupling as in claim 6 including a second bank of detents disposed axially upstream of said detent means complimenting said tool engaging surface formed on said nut for preventing disengagement thereof and means for anchoring said sleeve-like element to prevent rotation thereof.

* * * * *